(12) United States Patent
Nash et al.

(10) Patent No.: US 7,343,301 B1
(45) Date of Patent: Mar. 11, 2008

(54) METHOD AND APPARATUS FOR NOTIFICATION OF DATA TRANSFER

(75) Inventors: Mike Nash, Kanata (CA); Dave North, Orleans (CA); Sean Gates, Dunrobin (CA)

(73) Assignee: Signiant, Inc., Burlington, MA (US)

( * ) Notice: Subject to any disclaimer, the term of this patent is extended or adjusted under 35 U.S.C. 154(b) by 793 days.

(21) Appl. No.: 10/231,180

(22) Filed: Aug. 30, 2002

(51) Int. Cl.
*G06Q 10/00* (2006.01)
*G06F 15/173* (2006.01)

(52) U.S. Cl. .......................................... 705/1; 709/238
(58) Field of Classification Search ........ 709/213–216, 709/223, 238, 250
See application file for complete search history.

(56) References Cited

U.S. PATENT DOCUMENTS

| | | | |
|---|---|---|---|
| 5,319,644 A | 6/1994 | Liang | 370/85.5 |
| 5,519,863 A | 5/1996 | Allen et al. | 395/650 |
| 5,552,776 A | 9/1996 | Wade et al. | 340/825.31 |
| 5,796,966 A | 8/1998 | Simcoe et al. | 395/311 |
| 6,006,019 A | 12/1999 | Takei | 395/200.54 |
| 6,064,656 A | 5/2000 | Angal et al. | 370/254 |
| 6,163,543 A | 12/2000 | Chin et al. | 370/400 |
| 6,163,809 A | 12/2000 | Buckley | 709/237 |
| 6,199,109 B1 | 3/2001 | Reder et al. | 709/224 |
| 6,219,706 B1 | 4/2001 | Fan et al. | 709/225 |
| 6,298,061 B1 | 10/2001 | Chin et al. | 370/400 |
| 6,396,511 B1 | 5/2002 | Karino | 345/744 |
| 6,557,122 B1 * | 4/2003 | Sugauchi et al. | 714/57 |
| 6,600,812 B1 * | 7/2003 | Gentillin et al. | 379/45 |
| 6,718,361 B1 * | 4/2004 | Basani et al. | 709/201 |
| 6,763,384 B1 * | 7/2004 | Gupta et al. | 709/224 |
| 6,823,373 B1 * | 11/2004 | Pancha et al. | 709/219 |
| 2002/0032769 A1 | 3/2002 | Barkai et al. | 709/224 |
| 2002/0049834 A1 | 4/2002 | Molnar | 709/219 |
| 2002/0099729 A1 * | 7/2002 | Chandrasekaran et al. | 707/203 |
| 2002/0104008 A1 | 8/2002 | Cochran et al. | 713/200 |
| 2002/0116485 A1 * | 8/2002 | Black et al. | 709/223 |
| 2002/0116616 A1 | 8/2002 | Mi et al. | 713/168 |
| 2002/0165961 A1 * | 11/2002 | Everdell et al. | 709/225 |
| 2002/0169694 A1 | 11/2002 | Stone et al. | 705/27 |
| 2003/0014482 A1 | 1/2003 | Toyota et al. | 709/203 |
| 2003/0028495 A1 * | 2/2003 | Pallante | 705/78 |

(Continued)

OTHER PUBLICATIONS

Premo, Rita, A picture-perfect travel log; Working Wise; Avaya Inc.,; Brief Article, Aug. 1, 2002, Security Management, No. 8, vol. 46, p. 25; ISSN: 0145-9406, pp. 1-3.*
ISOCOR Releases Industry's Most Powerful Message Server, Nov. 14, 1994, M2 Presswire, pp. 1-3.*

*Primary Examiner*—Jamisue A Plucinski
(74) *Attorney, Agent, or Firm*—Pillsbury Winthrop Shaw Pittman LLP (57) ABSTRACT

The present invention provides a method and apparatus for notifying designated individuals of the success, failure or other status of a data transfer process. The system includes a central management computer for controlling the data transfer process and distributed agents for carrying out the process. As the data transfer process continues, the status, including success or failures of individual steps, is communicated to the central management computer in encoded messages within a control protocol. The central management computer retains logs of the status. Upon completion or termination of the data transfer process, the logs or other information regarding status of the process are provided to designed persons by the central management computer.

20 Claims, 6 Drawing Sheets

U.S. PATENT DOCUMENTS

| | | | |
|---|---|---|---|
| 2003/0046103 A1* | 3/2003 | Amato et al. | 705/1 |
| 2003/0051026 A1 | 3/2003 | Carter et al. | 709/224 |
| 2003/0056096 A1 | 3/2003 | Albert et al. | 713/168 |
| 2003/0065950 A1 | 4/2003 | Yarborough | 713/201 |
| 2003/0120822 A1* | 6/2003 | Langrid et al. | 709/251 |
| 2003/0126195 A1* | 7/2003 | Reynolds et al. | 709/203 |
| 2003/0212806 A1 | 11/2003 | Mowers et al. | 709/229 |
| 2003/0216958 A1* | 11/2003 | Register et al. | 705/14 |

* cited by examiner

METHOD AND APPARATUS FOR NOTIFICATION OF DATA TRANSFER

FIELD OF THE INVENTION

The invention relates to a method and apparatus for sending notifications to designated individuals regarding the status of a data transfer process, where the notification messages are sent as part of a system for controlling the distribution of data over a computer network using a centralized manager that controls a plurality of agents where agents are communicating peers and the central manager controls the distribution of data between them using data distribution rules stored in a central data distribution rules database.

BACKGROUND OF THE INVENTION

For years, a company's success depended on its ability to receive, manufacture, and ship physical goods. However, as the industrial economy gave way to the information economy, the game changed. Over the past several decades, the use of electronic communications by individuals and companies has exploded. There is a great need for companies to share electronic information, within a company, between companies and with the public. Furthermore, product ordering, and even delivery for digital products, is now regularly performed electronically. However, the increase in electronic communications and commerce has also created numerous problems of reliability, security, and coordination. These problems are not adequately address by existing mechanisms for transferring electronic information.

In the 21st century, business success no longer hinges on the movement of physical goods, but on the exchange of data: a company's ability to produce, add value to, and derive value from data is crucial to its success. Regardless of whether data is satellite imagery, software source, seismic exploration results, reinsurance documentation or any other form of electronic information, data is critical to modern businesses. Furthermore, enterprises need to collaborate with suppliers, partners and customers, while doing so with fewer fixed costs and less capital. To be successful, enterprises must efficiently move data without stumbling on system, geographic or corporate boundaries. The expansion of information transfers and cost reduction pressures have impeded the ability of companies to properly handle electronic information.

Often the process of exchanging data relies on homegrown tools for information transfer. Many companies expend substantial effort scripting data transfers that use the File Transfer Protocol (FTP), rather than applying resources to revenue generating activities. Automating just one simple process can take many person-months of effort.

Many organizations attempt to secure electronic transfer over public Internet Protocol-based networks using Virtual Private Networks (VPNs). However, VPNs offer nothing in terms of process automation and application integration and require compatible VPN implementations at either end of the connection. It is unrealistic to expect all suppliers, vendors, customers, trading partners, or collaborators to implement company specific VPNs in order to communicate.

Extensive mergers and acquisitions have also changed the state of today's enterprise and the need for information sharing. This trend is prevalent in the high-tech sector, where established players are acquiring or merging with smaller companies in niche markets. This growth increases the necessity to have a reliable means of sharing data between two companies that need to operate as one. Companies are often relying on physical media and homegrown systems to transfer business critical data from one work site to another. With a merger or acquisition, companies are faced with the troubling task of needing to distribute physical media to more people or linking new users who are operating on disparate systems into their homegrown data transfer solution.

As the challenge of transferring data with their customers, partners and suppliers swells for organizations, there is a growing need for different solutions for different "classes" of business data. Much like the postal service deals with letters and packages of varying shapes and sizes, so does data transfer. For example, data that must be distributed to many people around the world is best delivered using a browser-based Internet download solution. On the other hand, critical corporate data that requires process automation and high levels of security is best distributed using an automated data distribution model.

Existing systems and processes for communicating or transferring electronic data have great deficiencies in meeting many needs of today's businesses. In particular, existing solutions lack the ability to address automated, event-driven, system-to-system data distribution requirements. They also lack the ability to provide proper security with ease of use and wide distribution. Furthermore, they are not easily scalable or interoperable. Therefore, a need exists for a system that automates secure system-to-system data distribution amongst a large number of sources and targets over any network.

SUMMARY OF THE INVENTION

The deficiencies of the prior art are substantially overcome by the system of the present invention which includes a system having at least two computers or other terminal devices between which data is transferable, a central manager, a set of data distribution rules and distribution agents associated with each of the computers or terminal devices. The data distribution rules are stored in the central manager and include information necessary for the proper transfer of data from one location to at least one second location. For example, the data distribution rules may include file source and destination information, file formatting information, tasks to be executed before or after transfers, dependencies between transfers, firewall traversal information, and encryption information. The distribution rules are communicated to the distribution agents which process the rules to carry out the data transfer. Distribution agents may operate independently or in combination. As an alternative to including all of the transfer information in the distribution rule, appropriate information may be included in a distribution agent. The distribution agents are responsive to receipt of specific information to perform their individually designated process. Therefore, upon receipt of a distribution rule from the central manager, either through a direct connection or a connection through another distribution agent, a distribution agent can respond by retrieving the desired file or files, properly formatting them, transferring the files to the designated recipient and performing other functions including local command execution. Upon receipt of instructions and data, another distribution agent appropriately receives the data, including any necessary decryption, stores the data file according to its defined rules, and performs other functions including local command execution. The central manager can also coordinate multiple data transfers, remote command executions, and manage dependencies between them including serial and conditional execution. Two-way communication links between the central manager and one of the distribution agents or between distribution agents preferably are maintained during a transfer process. These communication links may be through one or more local area networks, wide area networks, proprietary networks, global networks or other networks, including wired, wireless or a combination of wired and wireless networks.

According to another aspect of the invention, the distribution rules include a notification process. The notification process identifies information to be sent by the distribution agents upon completion or failure of any part of a data transfer process. According to an aspect of the invention, the completion or termination of each step performed by a distribution agent is communicated through the open communication line to the central manager. The central manager maintains at least one log of the communicated completion and termination information. Upon completion or termination of all of the parts of the data transfer process defined by a distribution rule, notification is performed, also as defined by the distribution rule. The notification rule can include the person or persons to notify and the information to include in the notification. According to an aspect of the present invention, the notification may provide different notifications for completions of the data transfer process than for failure of the data transfer process. According to an aspect of the invention, two logs are used, one for completed items and one for failed or terminated items. Only one of the logs is provided in the notification process depending upon the success or failure of the data transfer.

According to another aspect of the inventions, agents communicate real-time status information to the manager through the manager-agent control protocol. The notification apparatus inserts encoded notification messages into the control protocol stream and processes the encoded notification messages in the control protocol at the manager for delivery to external recipient in the indicated form. Notification logic is coded into the data distribution rules as part of custom data distribution logic extensions that execute at various call-out points in the data distribution process.

DETAILED DESCRIPTION

Figure 1:
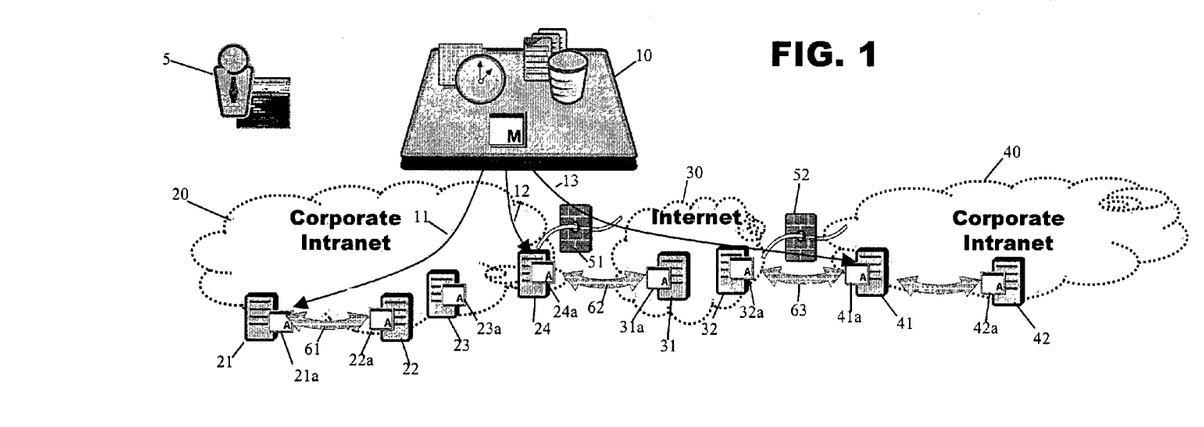
FIG. 1 illustrates a data transfer system according to an embodiment of the present invention.

The present invention provides a distributed system for efficient and adaptable data transfer and control. FIG. 1 illustrates a data transfer system 1 in accordance with an embodiment of the present invention. The data transfer system 1 is formed of a plurality of computers 10, 21, 22, 23, 24, 31, 32, 41, 42. These computers may be of any currently known types, including personal computers, minicomputers, mainframes, servers, etc. Furthermore, the present invention is not limited to computers. The transfer processes of the present invention can be used with any device to or from which data may be transferred, including, in addition to computers, PDAs, MP3 players, cellular telephones, etc.

The following description of the system of the present invention uses the term computers for ease of reference. The exact nature of the computers used is not important to the data transfer system 1. The key feature of such computers is the ability to communicate to other computers in order to carry out the operations of the present invention as described below. The computers can communicate in any known manner, including through wired or wireless local area networks, wide area networks, global area networks, peer-to-peer connections, or other communications links. As illustrated in FIG. 1, different types of networks can be utilized depending upon the desired source and destination of any data transfers. FIG. 1 illustrates computers networked in two separate corporate intranets 20, 40 which are joined by the Internet 30. Firewalls 51, 52 are disposed in the connections between the intranets 20, 40 and the Internet 30. Of course, any other configurations are possible for the present invention.

As illustrated in FIG. 1, the data transfer system 1, includes a central management computer 10 and a plurality of distribution agents 21a, 22a, 23a, 24a, 31a, 32a, 41a, 42a, each associated with one of the computers in the data transfer system 1. A distribution agent is a piece of software which resides on a local computer. The distribution agent responds to communications from the central management computer 10, or any of the other computers, to perform programmed steps in a data transfer. The central management computer 10 stores a set of distribution rules. Each rule corresponds to a particular data transfer process to be performed.

Operation of the data transfer system 1 will now be described. Based upon a set timing, upon the occurrence of a specified condition or at other times, the central management computer 10 establishes a communication link 11 to one of the computers 21 in the data transfer system 1. The timing can be based on various given factors. Generally, the timing of data transfers are based either on a schedule or upon occurrence of an event. Schedules are used for transfers to occur at specified times. Schedules may be set to accommodate other uses of resources, such as making data transfers outside of regular working hours. Events can also be used to trigger a transfer which is dependent upon the event, but not on a particular timetable. Alternatively, the timing can be based upon a specified event. For example, a request for a transfer can be sent to the central management computer. Upon receipt of a request, an appropriate communications link can be created by the central manager to provide the transfer.

Once a communication link 11 is established, a distribution rule is transferred from the central manager to the connected computer 21. A distribution rule includes a set of steps for execution by the agent 21a on the connected computer 21 necessary to complete the desired data transfer. Such steps may include retrieval of the specified data from a source connected to the computer 21, encryption of the data, formatting of the data, conversion of the data to a different format, firewall traversal processes, or any other process necessary to properly transfer data. Additionally, the distribution rule may include steps to be performed upon reception of the data, such as decryption, change in formatting, and storage of the data at the recipient computer. The distribution rule may also reference scripts to be performed before, after or during execution of steps in the data transfer. Thus, for example, information from a database can be extracted prior to a transfer.

Upon receipt of the distribution rule, the agent 21a performs the steps in the rule. In order to transfer data, a communication link 61 is opened between the source computer 21 and a recipient computer 22. The exact nature of the communication link 61 depends upon the specific types and operations of the source computer 21 and the recipient computer 22. The nature of the communication link 61 and the process for establishing it may be included in the distribution rule. Alternatively, these processes may be implemented by the agents 21a, 22a on each of the computers. Once a communication link 61 is established, the agent 21a performs the steps identified by the distribution rule to transfer the data.

As illustrated in FIG. 1, data transfers may occur within a single network or across networks. The data transfer system 1 is indifferent to the network structures. The processes for making transfers between networks are included in the distribution rules stored on the central management computer 10. The procedure for transferring data between networks is essentially the same as for transfers within a network. The central management computer 10 opens a communication link 12 with a source computer 24 and transmits the appropriate data distribution rule. The source computer 24, pursuant the scripts in the data distribution rule, establishes a communications link 62 with a recipient computer 31. When a data transfer crosses networks, the data distribution rule may include information about traversing the firewall 51, if any, between the networks.

The above examples illustrate the central management computer 10 establishing a communications link with source computers 21, 24 for moving data from the source computer 21, 24 to recipient computers 22, 31. However, nothing in the present invention limits operation to a "push" transfer. As illustrated in FIG. 1, the communications links 61, 62 used in making the transfers are bi-directional. Data could just as easily be transferred from computer 22 to computer 21 over communication link 61 as the other way around. Thus, the central management computer 10 may open a communication link with computer 21 with a distribution rule requesting a transfer to computer 21 from another computer. Computer 21 would then establish a communication link 61 with another computer 22 having the desired data. Using the communication link, computer 21 requests that computer 22 transfer the appropriate data over the communication link. For ease of discussion, operation of the system is described herein as transferring data from a controlling computer 21, i.e. the computer receiving a distribution rule first, to the non-controlling computer 22, i.e. the computer receiving the distribution rule from the controlling computer. However, communication of the distribution rule, from the central manager or any other computer, is independent of the direction of data transfer.

Finally, the data transfer system 1 includes a management interface 5 connected to the central management computer 10 for establishing the distribution rules and installing the agents. The management interface 5 includes appropriate authentication procedures, such as user identification and passwords to prevent unauthorized changes to the central management computer 10. An appropriate user interface is implemented on the management interface 5 in order to develop and install distribution rules. The management interface 5 is also used to set or modify the schedules for execution of distribution rules. Furthermore, the management interface 5 does not have to be a single purpose unit. Rather, it may be any computer which can connect to the central management computer 10. The authorization process may also limit a specific user to creation or modification of only some distribution rules. In this manner, different entities may modify rules applicable to those entities. The distribution agents on each of the computers may also be installed by the central management computer 10 through use of the management interface 5. Various authorization and security procedures can be used to control the installation or modification of distribution agents.

Since the data transfer process is defined by distribution rules, the data transfer system 1 of the present invention can easily accommodate different data transfer types to meet virtually any need. FIGS. 2a-2e illustrate different possible scenarios for data transfer.

Figure 2A:
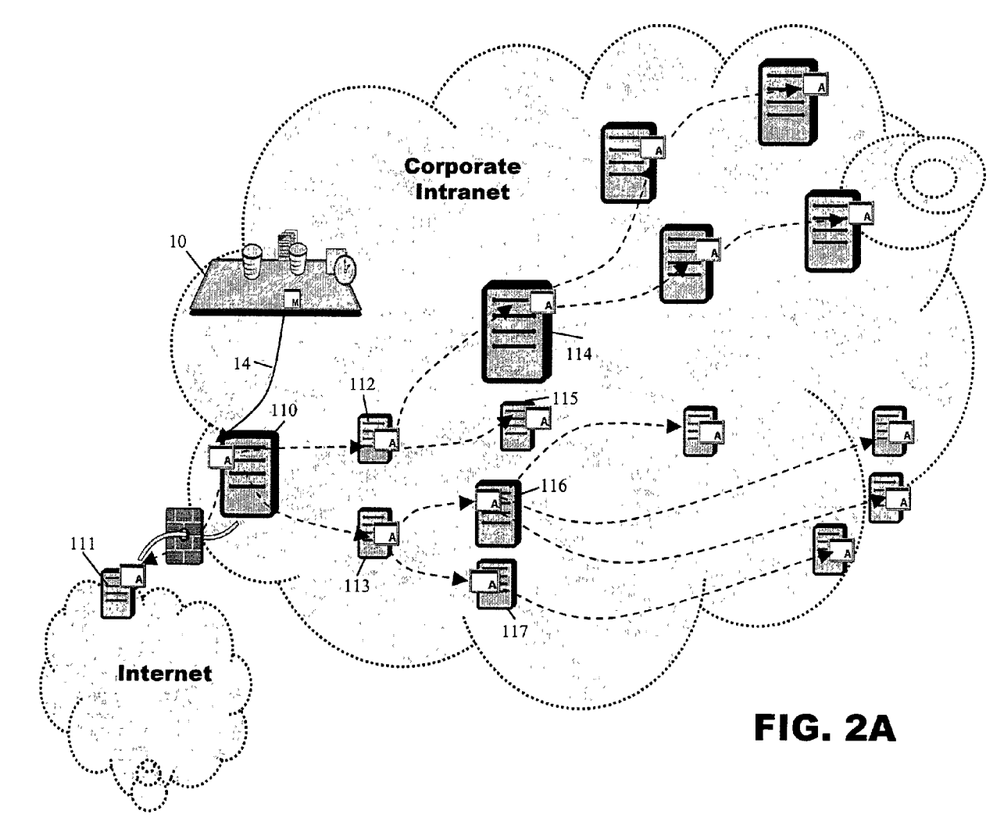
FIGS. 2a-2e illustrate operation of distribution rules and distribution agents within a data transfer system according to an embodiment of the present invention.

FIG. 2a illustrates a fan out process for distributing copies of the same data to a plurality of computers within or outside of a company. As illustrated in FIG. 2a, the central management computer 10 does not have to be a separate, stand-alone computer, but can be a part of a corporate intranet. Furthermore, more than one central management computer 10 can be used to store distribution rules for different companies or for a single company. In the fan out process of FIG. 2a, the central management computer 10 establishes a communication link 14 with a primary source computer 110. The distribution rule transferred over the communication link 14 includes information about distribution of selected data to various computers. According to the distribution rule, the primary source computer 110 transfers the data to three secondary computers 111, 112, 113. One of the secondary computers 111 is located outside of the corporate intranet and two of the secondary computers 112, 113 are within the intranet. The processes for transferring the data to each of the secondary computers 111, 112, 113 are part of the distribution rules and are not necessarily the same. For example, the transfer to secondary computer 111 may include firewall processes, which are not part of the internal transfers. The agents 112a, 113a on the secondary computers 112, 113 also operate on the distribution rule to further transfer the data to additional computers 114, 115, 116, 117. In this manner, the distribution rule controls data transfer paths and optimizes the transfer process. The primary source computer 110 does not have to make separate transfers to all of the computers to receive the data. Since each recipient computer includes a distribution agent, subsequent distributions are possible from the recipient. Thus, an entire, complicated transfer process can be included as part of a distribution rule, which is distributedly executed by the distribution agents on the various computers.

Figure 2B:
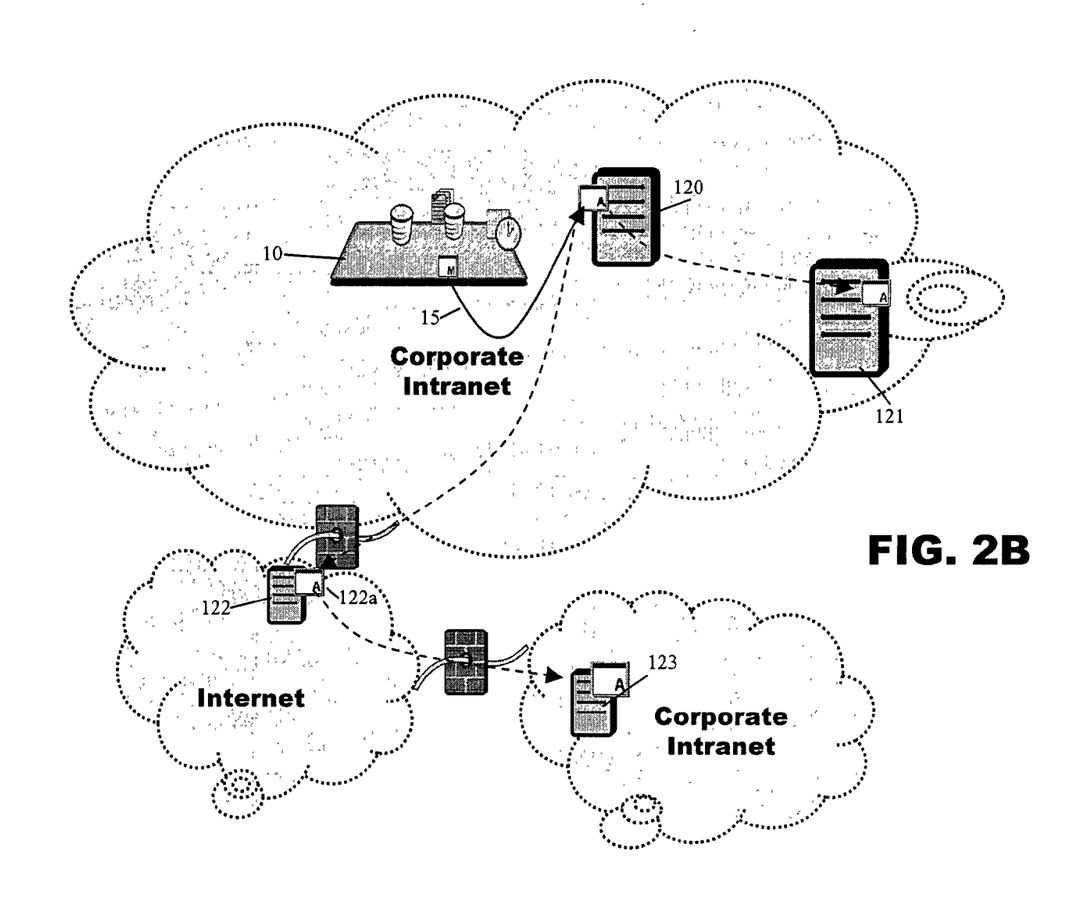

FIG. 2b illustrates a replication process. The central management computer 10 establishes a communication link 15 with a primary source computer 120 and transmits the distribution rule. The primary computer then transfers the appropriate data to computers 121, 122 both within and outside the intranet. The distribution agent 122a on the computer 122 in the internet further processes the distribution rule to transfer the data to computer 123 on another intranet.

Figure 2C:
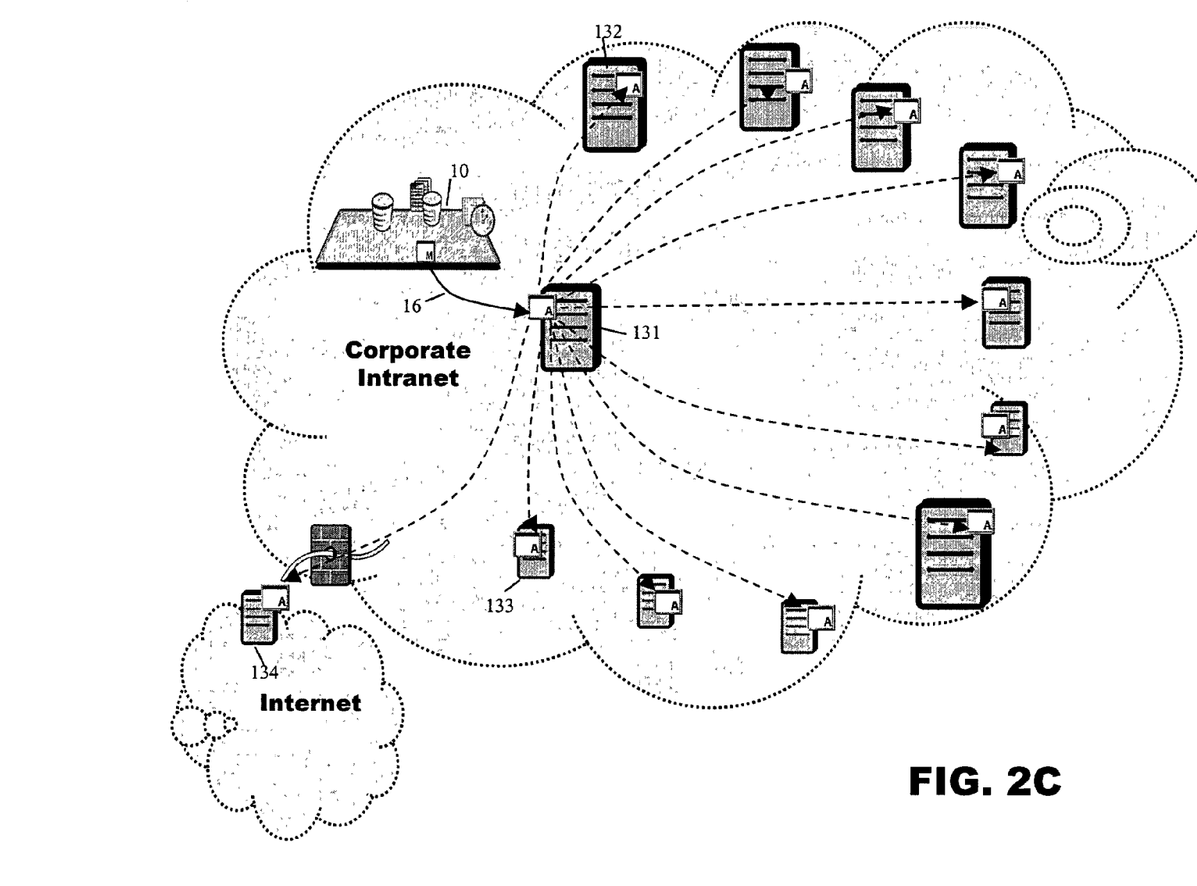

FIG. 2c illustrates a multiple copy replication process. Upon receipt of a distribution rule from the central management computer 10, the primary source computer 131 transfers the data to a plurality of computers 132, 133, 134. While the fan out process of FIG. 2a also transfers data to multiple computers, the procedure is different from the replication process in FIG. 2c since the primary source computer 131 makes all of the transfers in the process of FIG. 2c.

Figure 2D:
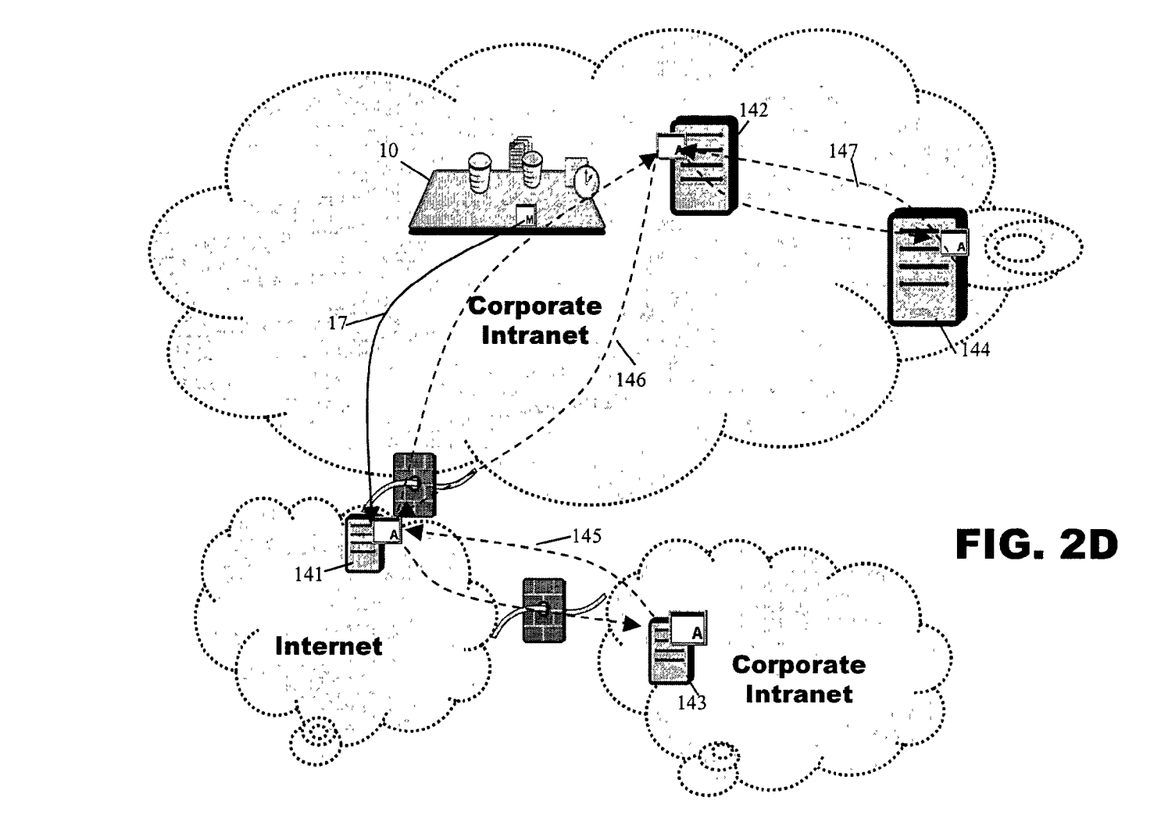

FIG. 2d illustrates a synchronization process. Since the steps for processing the data prior to transfer or upon receipt are included in the distribution rule, complex processes can be implemented. In the illustration of FIG. 2d, a primary computer 141 is used to synchronize data on several different computers 142, 143, 144 which are included within different networks. The central management computer 10 transmits 17 the distribution rule to the primary computer 141. The primary computer then establishes two-way communication links 145, 146 to secondary computers. The two-way communications links 145, 146 are used to synchronize data in the secondary computers 142, 143 and the primary computer 141. Furthermore, the distribution agent in secondary computer 142 establishes a two-way communication link 147 with another computer 144. This two-way communication link 147 is used to synchronize the data with this other computer 144. In this manner, complex synchronization can be implemented using simple distribution rules.

Figure 2E:
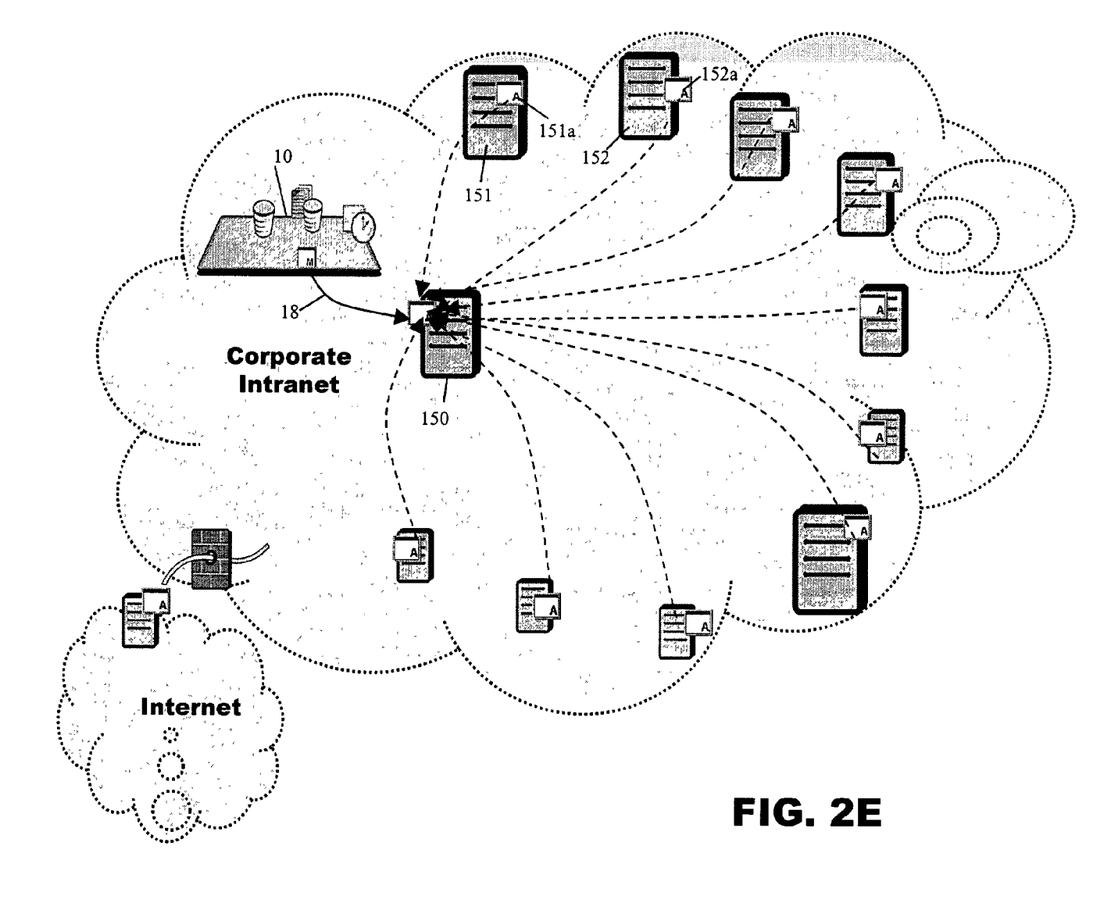

FIG. 2e illustrates an aggregation process. The central management computer 10 transmits a distribution rule to a primary computer 150. The primary computer 150 establishes communication links 161, 162 with a plurality of computers 151, 152. The distribution agents 151a, 152a on each of the plurality of computers responds to the distribution rule from the primary computer 150 by transferring data to the primary computer 150. In this manner, the primary computer receives and aggregates the data from the plurality of computers 151, 152.

FIGS. 2a-2e are merely illustrative of different processes which can be implemented using the data transfer system of the present invention. Other possible transfer processes may also be implemented by setting up appropriate data distribution rules.

Figure 3:
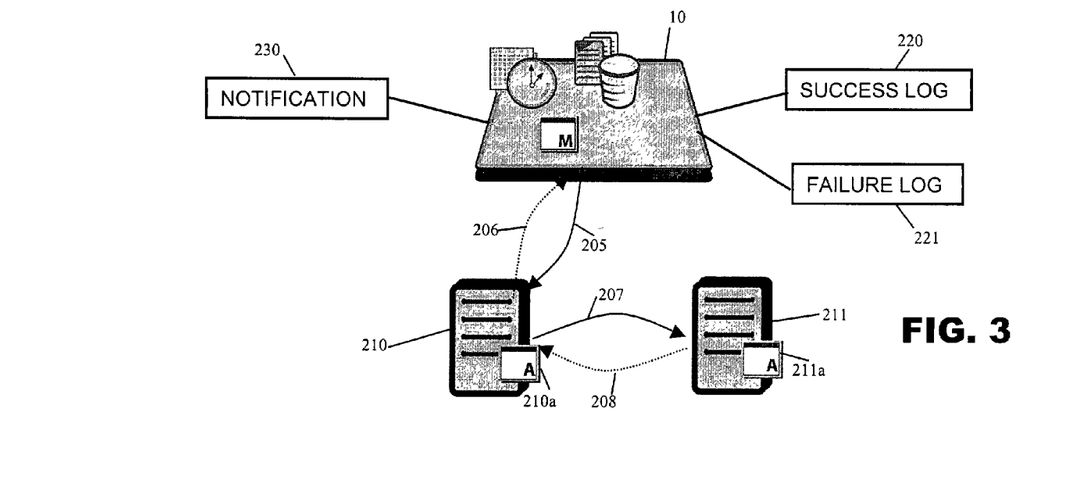
FIG. 3 illustrates operation of notification message processing according to an embodiment of the present invention.

FIG. 3 illustrates a notification process according to another aspect of the present invention. As noted above, the data transfer processes in the present invention are performed through communication links between computers. The same or other communication links can be used to provide feedback on the data transfer process. In particular, the distribution rule may include a process for reporting for the success or failure of all or any part of the data transfer process. As illustrated in FIG. 3, the central management computer 10 establishes a communication link 205 with a primary computer 210. The primary computer 210 establishes a communication link 207 with a secondary computer 211 for data transfer. At certain call-out points in the data transfer process, as defined by the distribution rule, the status of the process is communicated to the central management computer. In particular, the agent 211a on the secondary computer 211 transmits status information over part of the communication link 208 with the primary computer 210. Similarly, the agent 210a on the primary computer transmits the status information, its own and that received from the secondary computer 211 to the central management computer 10 over part of the communication link 206.

According to an embodiment of the present invention, the communication link 205 between the central management computer 10 and the primary computer 210 operates according to a control protocol. Messages are passed over the communication link 205 as part of the control protocol. The status information can be sent as encoded messages within the control protocol. The central management computer 10 processes the encoded messages within the control protocol to retrieve the status information.

The status information is stored in one or more status logs 220, 221. According to an embodiment of the present invention, two status logs are used, a success log 220 and a failure log 221. Status information is added to the appropriate log throughout the data transfer process. Upon completion or termination of the data transfer process, a notification procedure 230 is implemented as defined by the distribution rule. In particular, information about the success or failure of the data transfer process is provided to a designated person. Different procedures can be used and information communicated in the notification process 230. For example, the success log 220 and/or failure log 221 could be emailed to a designated address. A telephone call could be placed to a designated number merely providing the success or failure of the entire process. The notification may be provided to multiple people, for example, to people at two different companies involved in the data transfer.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A system for providing notification of the status of a data transfer process by which data is transferred from a primary computer to a secondary computer, the system comprising:

a primary computer and a secondary computer;

a management computer for distributing at least to the primary computer a set of distribution rules for the data transfer process;

the primary computer having data to be transferred by the data transfer process to the secondary computer in accordance with the distribution rules;

a first communication link, between the management computer and the primary computer, over which the set of distribution rules are transferred and over which status information relating to the data transfer process can be communicated;

a second communication link between the primary computer and the secondary computer;

wherein the primary computer includes means for initiating the data transfer process in accordance with the distribution rules and transferring the data over the second communication link to the secondary computer;

wherein the secondary computer includes means for providing to the primary computer, over the second communication link, information, in accordance with the distribution rules, regarding a status of data actually received at the secondary computer by the data transfer process;

wherein the primary computer includes means for providing to the management computer, over the first communication link, information, in accordance with the distribution rules, regarding a status of the data transfer process, including a status of an initiation of the data transfer process by the primary computer and the status of data actually received by the secondary computer by the data transfer process; and wherein the management computer includes means for providing a notification based upon the information regarding the status of the data transfer process to one or more designated destinations based on the set of distribution rules.

2. The system for providing notification of the status of a data transfer process according to claim 1, wherein the management computer includes:

a success log for recording successful completion of part of the data transfer process; and a failure control log for recording failed parts of the data transfer process; and wherein the means for providing a notification include means for providing the success log or the failure log.

3. The system for providing notification of the status of a data transfer process according to claim 1, wherein the means for providing the notification include means for sending an electronic message to at least one designated address.

4. The system for providing notification of the status of a data transfer process according to claim 3, wherein the means for providing the notification include means for sending the electronic message to a plurality of designated addresses.

5. The system for providing notification of the status of a data transfer process according to claim 1, wherein the one or more designated destinations are one or more designated persons, one or more designated addresses, or both.

6. A computer-based method for providing notification of a status of a data transfer process by which data is transferred from a primary computer to a secondary computer, comprising the steps of:
   distributing distribution rules to the primary computer and the secondary computer;
   initiating a data transfer process at the primary computer according the distribution rules and transferring data to the secondary computer;
   receiving, from the secondary computer information regarding a status of data actually received at the secondary computer by the data transfer process, according to the distribution rules;
   receiving, from a primary computer which transfers data in the data transfer process, information regarding a status of an initiation of the data transfer process, according to the distribution rules; and
   storing the information regarding the status of the data transfer process including the status of the initiation of the data transfer process and the status of data actually received by the data transfer process;
   generating a notification including the status of the data transfer upon termination of the data transfer process.

7. The computer-based method for providing notification of the status of a data transfer process according to claim 6, wherein the step of receiving information includes encoding the information in a control protocol.

8. The computer-based method for providing notification of the status of a data transfer process according to claim 6, wherein the step of generating the notification includes sending an electronic message to at least one designated address.

9. A system for managing data transfer between a primary computer and a second computer over a network, comprising:
   a primary computer comprising a first distribution agent module;
   a second computer comprising a second distribution agent module;
   a management computer comprising a set of distribution rules and means for distributing distribution rules to the first and second distribution agent modules;
   wherein the first distribution agent module of the primary computer is programmed to initiate a data transfer process to transfer data to the second computer based on the set of distribution rules;
   wherein the second distribution agent module of the second computer is programmed to provide to the first distribution agent module of the primary computer, information, in accordance with the distribution rules, regarding a status of data actually received at the second computer by the data transfer process;
   wherein the first distribution agent module is programmed to provide the management computer, in accordance with the distribution rules information regarding a status of the data transfer process, including a status of an initiation of the data transfer process and the status of data actually received by the second computer by the data transfer process; and
   wherein the management computer provides notification, based upon the information regarding the status of the data transfer process, to one or more designated destinations based on the set of distribution rules.

10. A system for managing data transfer between a primary computer and a second computer over a network according to claim 9, wherein the one or more designated destinations are one or more designated persons, one or more designated addresses, or both.

11. A system for managing data transfer between a primary computer and a second computer over a network according to claim 9, further comprising:
   a first communications link between the management computer and the primary computer for transferring distribution rules to the primary computer; and
   a second communications link between the primary computer and the second computer for transferring distribution rules to second computer.

12. A system for managing data transfer between a primary computer and a second computer over a network according to claim 9, wherein distribution rules include rules for identifying call out points in the data transfer process for communicating the status of the data transfer to the management computer.

13. A system for managing data transfer between a primary computer and a second computer over a network according to claim 9, wherein the distribution rules include rules for requesting the status of the data transfer process.

14. A system for managing data transfer between a primary computer and a second computer over a network according to claim 9, wherein the distribution rules include rules for encrypting and decrypting data for the data transfer process.

15. A system for managing data transfer between a primary computer and a second computer over a network according to claim 9, wherein the distribution rules include rules for formatting the data for the data transfer process.

16. A system for managing data transfer between a primary computer and a second computer over a network according to claim 9, wherein the distribution rules include rules for converting data to a different format for the data transfer process.

17. A system for managing data transfer between a primary computer and a second computer over a network according to claim 9, wherein the distribution rules include rules for firewall transversal for the data transfer process.

18. A method for managing data transfer between a primary computer and a second computer over a network and for providing notification of a status of a data transfer, comprising the steps of:
   a management computer distributing a first set of distribution rules to a distribution agent module of the primary computer and a second set of distribution rules to a distribution agent module of the second computer;

at least one of the distribution agent modules initiating a data transfer between the primary computer and the second computer according to at least one of the first set or second set of distribution rules;

providing, to the management computer, status information of the data transfer according to at least one of the first set or second set of distribution rules; and providing a notification based upon the status information.

19. The method of claim 18, further including the step of: the second computer making subsequent data transfers to additional computers according to the second set of distribution rules of the distribution agent module of the second computer.

20. The method of claim 18, wherein the first set and the second set of distribution rules are different.

* * * * *